United States Patent [19]

Lampe et al.

[11] Patent Number: 5,129,222

[45] Date of Patent: Jul. 14, 1992

[54] CONSTANT AIR/FUEL RATIO CONTROL SYSTEM FOR EPU/IPU COMBUSTOR

[75] Inventors: Steven W. Lampe; Paul A. Schuh, both of San Diego, Calif.

[73] Assignee: Sundstrand Corporation, Rockford, Ill.

[21] Appl. No.: 541,748

[22] Filed: Jun. 21, 1990

[51] Int. Cl.⁵ .............................................. F02C 9/48
[52] U.S. Cl. ........................................ 60/39.27; 60/746
[58] Field of Search .................. 60/39.142, 39.27, 739, 60/742, 39.826, 727, 746

[56] References Cited

U.S. PATENT DOCUMENTS

| | | | |
|---|---|---|---|
| 2,643,511 | 6/1953 | Briggs | 60/39.142 |
| 2,873,577 | 2/1959 | Kenney et al. | 60/39.27 |
| 3,115,895 | 12/1963 | Fister et al. | 60/39.27 |
| 3,373,769 | 3/1968 | Chaves et al. | 60/39.27 |
| 4,337,616 | 7/1982 | Downing | 60/742 |
| 4,777,793 | 10/1988 | Weigand et al. | 60/39.27 |
| 4,815,277 | 3/1989 | Vershure et al. | 60/39.142 |
| 5,031,389 | 7/1991 | Lampe et al. | 60/727 |

Primary Examiner—Louis J. Casaregola
Attorney, Agent, or Firm—Antonelli, Terry Stout & Kraus

[57] ABSTRACT

A fuel and air control system (10, 100) for a power unit which produces output power from a turbine which rotates in response to pressurized gas provided by a combustor (12) which combusts fuel which is injected into the combustor by a primary fuel injector (14) to produce the pressurized gas cooled by fuel injected into the combustor by a secondary fuel injector (16) in accordance with the invention includes a fuel control valve (30) coupled to a source of fuel which controls a combined fuel flow through a fuel flow path (32) from the control valve to the injectors in response to a fuel flow control signal; an air control valve (44) coupled to an air source which controls a mass flow of air through an airflow path to the combustor in response to an airflow control signal; and a controller (34), providing the control signals, for causing the valves to produce flows resulting in a constant air/fuel ratio in the combustor during combustion when the fuel flow and air flow are varied under control of the controller.

23 Claims, 3 Drawing Sheets

CONSTANT AIR/FUEL RATIO CONTROL SYSTEM FOR EPU/IPU COMBUSTOR

CROSS REFERENCE TO RELATED APPLICATION

Reference is made to U.S. patent application Ser. No. 450,671 which was filed on Dec. 14, 1989 and is assigned to the Assignee of the present invention. Ser. No. 450,671 is incorporated herein by reference in its entirety.

DESCRIPTION

1. Technical Field

The present invention relates to controls for systems for generating auxiliary or emergency power on airframes.

2. Background Art

Emergency power units (EPU) are utilized by airframes for generating emergency hydraulic and/or electrical power when the jet propulsion engines have flamed out for maintaining control of the airframe at altitudes where the air breathing auxiliary power unit (APU) will not operate. An APU is used for generating emergency power and power on the ground such as for starting. EPUs are typically used in high performance aircraft at altitudes above 40,000 feet where insufficient air exists to generate sufficient power with an air breathing APU. An integrated power unit (IPU) is an integrated system which performs the functions of an EPU and an APU. An EPU and an IPU utilize a combustor which decomposes a stored fuel and gas to generate a gas stream which powers a rotor of a turbine which drives one or more power generating units for generating the aforementioned emergency power to maintain control of the airframe during flameout or starting of the propulsion engines.

The Assignee of the present invention manufactures combustors utilized in EPUs and IPUs which have a control valve regulating the flow of fuel to a primary injector and an airflow control which maintains a stoichiometric air/fuel ratio in a primary combustion zone and a control valve regulating the flow of fuel to a secondary fuel injector which injects fuel to cool the resultant combustion product gas stream prior to impingement on the turbine rotor to a temperature which will not damage the turbine rotor.

The speed of a EPU turbine is controlled in systems currently manufactured by the Assignee of the present invention with separate primary and secondary fuel servo systems. Airflow is calculated by measuring pressure and temperature of air flowing into a venturi which is inputted to the combustor of the turbine. Primary fuel flow is controlled by the primary fuel servo based upon the calculated mass flow and the desired stoichiometric fuel ratio in the primary combustion zone of a constant 13.25. The secondary fuel flow to the combustor is calculated to have an air/fuel ratio equal to a constant 2.30. Two separate fuel servo systems were utilized based upon the assumption that a separate temperature control loop was required for the turbine inlet temperature. Additionally, the secondary fuel injector is an atomizing injector which has limitations regarding the maximum fuel flow which may flow without destroying the atomized spray pattern. Two separate servos permitted maximum and minimum fuel flow limits to be applied to the secondary injector without affecting the primary fuel flow air/fuel ratio.

U.S. patent application Ser. No. 450,671, assigned to the Assignee, discloses an airframe power unit in which the flow of fuel to the primary and secondary injectors is controlled by separate servo systems. Ser. No. 450,671 includes a fuel control system which operates in the same way as the aforementioned control of turbine speed of EPUs manufactured by the Assignee of the present invention.

The prior art fuel flow control systems for power units manufactured by the Assignee of the present invention require expensive metering valves as a consequence of separate servo controlled valves being present in the primary and secondary fuel circuits. The dynamic range of the primary fuel injector has a ratio of maximum flow rate to minimum flow rate of 20:1. A valve had to be used having a large turndown ratio as a consequence of the power unit requiring precise control of fuel metering throughout the dynamic range of flow from the minimum flow rate to the maximum flow rate to the primary combustor. Valves having a large turndown ratio are more expensive and have substantial hysteresis which decreases accuracy in the fuel control.

DISCLOSURE OF INVENTION

The present invention is a fuel and air control system and a method of controlling a power unit in which a constant air/fuel ratio is provided in a combustor having a primary fuel injector which injects fuel into the combustor to produce a pressurized gas which is cooled by fuel injected into the combustor by a secondary fuel injector in which a fuel control valve which is coupled to a source of fuel controls a combined fuel flow through a fuel flow path from the control valve to the injectors in response to a fuel flow control signal. The invention eliminates the separate primary and secondary fuel control servo systems contained in the prior art. The elimination of separate primary and secondary fuel control servo systems has advantages which are that the overall control system is simplified, control is accomplished with fewer independent variables with a resultant higher reliability and the expense of the fuel control valve is reduced as a consequence of the single valve having a lower turndown ratio than that which was required in the prior art primary fuel flow circuit. Furthermore, the present invention eliminates the use of a venturi for calculating mass airflow required to produce a constant air/fuel ratio. The venturi contained in the prior art system which is disclosed in Ser. No. 450,671 causes an additional pressure drop from the air pressure source.

In a preferred embodiment of the present invention, the airflow control valve and the fuel flow control valve are integrated into a single valve in which airflow to the combustor and the combined rate of fuel flow to the primary and secondary injectors is controlled by a single signal from a controller. The signal controls a metering device which meters a rate of airflow and fuel flow by moving the metering device a distance which is a function of the power level produced by the power unit which is commanded by the controller. The single valve includes a mechanism for providing temperature compensation to change the distance which only the air metering device moves as a function of temperature of the air flowing through the valve.

Preferably, the air supplied to the air control valve is provided at a constant pressure from the output of a pressure regulator coupled to a higher pressure source of air. Elimination of the venturi in the prior art which was used to calculate the mass flow of air for control in the present invention permits a lower air pressure source to be used which in an EPU is a stored bottle of air which results in lesser weight as a consequence of the air bottle pressure being lowered with a savings in the weight of air stored and the thickness of the walls of the air bottle.

A fuel and air control system for a power unit which provides output power from a turbine which rotates in response to pressurized gas provided by a combustor which combusts fuel which is injected into the combustor by a primary fuel injector to produce the pressurized combustion gases cooled by fuel injected into the combustor by a secondary fuel injector in accordance with the invention includes a single fuel control valve coupled to a source of fuel which controls a combined fuel flow through a fuel flow path from the control valve to the injectors in response to a fuel flow control signal; an air control valve coupled to an air source which controls a mass flow of air through an airflow path to the combustor in response to an airflow control signal; and a controller, providing the control signals, for causing the valves to produce flows resulting in a constant air/fuel ratio in the combustor during combustion when the fuel flow is varied under the control of the controller. The mass flow of air through the airflow path to the combustor is not dependent upon pressure in the combustor.

The invention further includes an air valve position sensor providing a position signal to the controller specifying a position of the air control valve; a temperature sensor coupled to the airflow path for providing a temperature signal to the controller specifying air temperature within the airflow path; and wherein the controller, in response to the position and temperature signals, calculates a mass flow of air in the airflow path and generates the fuel flow control and airflow control signals as a function of the calculated mass flow and an output power level commanded by the controller. The output power level is commanded by the controller by varying the air flow and the fuel mass flow rate is commanded to vary in dependence upon measured air flow of a calculated air flow calculated from a measured air pressure and measured air temperature while maintaining a constant primary and overall air/fuel ratio.

An air pressure regulator is coupled to a source of pressurized air for providing air at a constant pressure to the air control valve.

In a preferred embodiment of the present invention, the fuel control valve and air control valve are formed into a single valve which varies fuel flow and airflow in response to a single control signal from the controller while maintaining a constant air/fuel ratio. The single valve comprises a valve which meters a rate of airflow and fuel flow through the single valve by moving a metering device a distance which is a function of a power level commanded by the controller. The single valve includes a mechanism for providing temperature compensation to change the distance which the metering device moves in only controlling airflow as a function of temperature of air flowing through the valve.

The power unit may be an emergency power unit within an airframe or an integrated power unit within an airframe.

A method of controlling a power unit which provides output power from a turbine which rotates in response to pressurized gas provided by a combustor which combusts fuel which is injected into the combustor by a primary fuel injector to produce the pressurized gas cooled by fuel injected into the combustor by a secondary fuel injector in accordance with the invention includes controlling a combined fuel flow to the injectors in response to a fuel flow control signal; controlling a mass flow of air to the combustor in response to an airflow control signal; and generating the control signals to produce a constant air/fuel ratio in the combustor. The mass flow of air through the airflow path to the combustor is not dependent upon pressure in the combustor. The mass flow of air is calculated in response to a sensed temperature of air flowing to the combustor and a sensed position of an air control valve controlling the mass flow of air; and the signals are a function of the calculated mass flow and specified output power level. The output power level s commanded by varying the air flow and the fuel mass flow rate is commanded to vary in dependence upon calculated air flow calculated from a measured air pressure and measured air temperature while maintaining a constant primary and overall air/fuel ratio.

BEST MODE FOR CARRYING OUT THE INVENTION

Figure 1:
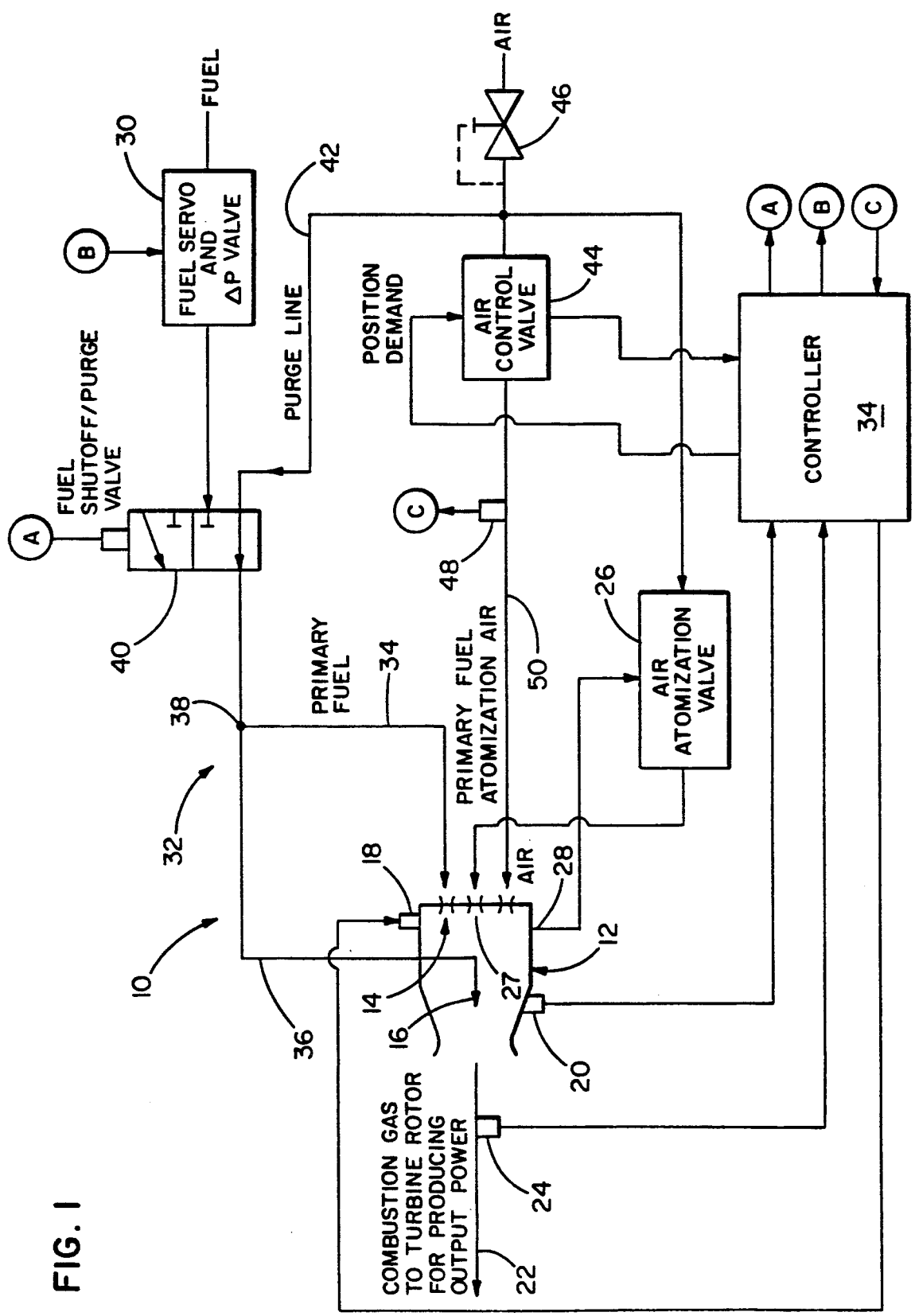
FIG. 1 illustrates a first embodiment of the present invention.

FIG. 1 illustrates a first embodiment 10 of the present invention. The present invention is preferably utilized as a fuel and air control system for a power unit which may be, but is not limited to a EPU or IPU utilized in an airframe as discussed above with respect to the prior art. The power unit includes a combustor 12 which has a primary combustion zone in which a primary fuel injector 14 injects fuel to produce stoichiometric combustion at a constant air/fuel ratio of 13.25. The combustor 12 also contains a secondary fuel injector 16 which injects fuel to cool the combustion gases in accordance with known operation of combustors manufactured by the Assignee as stated above to produce a ratio of 2:30. A conventional igniter 18 provides a spark discharge to ignite combustion within the combustor 12. A temperature sensor 20 senses the combustion temperature within the combustor 12 which is used as a control parameter for the operation of the combustor to prevent the gas stream 22 from reaching a temperature sufficiently high to damage the rotor of the turbine (not illustrated) which produces the output power from the power unit. A sensor 24 senses the turbine inlet temperature for purposes of system control in accordance with the prior art. Air atomization valve 26 controls the primary fuel atomization air injected into the combustor through input 27 as a function of sensed pressure sensed by pressure port 28 in the combustor in accordance with the prior art. The aforementioned elements of the combustor are conventional. Air injector 29 injects air into the combustor to maintain stoichiometric combustion.

A single fuel servo and ΔP valve 30 controls a combined fuel flow through a fuel flow path 32 from the fuel servo and ΔP valve to the injectors 14 and 16 in response to a fuel control signal applied from controller 34. The fuel flow path 32 includes a primary fuel path 34 and a secondary fuel path 36 which respectively are coupled at a bifurcation 38 within the fuel flow path. The ratio of the cross-sectional area in the primary fuel path 34 and in the secondary fuel path 36 determines the relative flow rates from the bifurcation point 38. The fuel servo and ΔP valve 30 replaces the individual primary and secondary fuel servo valves contained in the prior art with the advantages being an increased turndown ratio in the fuel servo and ΔP valve than that realized in the primary fuel servo in the prior art as a consequence of the overall ratio of maximum to minimum fuel flow rates in the system being less than the overall ratio of maximum to minimum fuel flow in the primary fuel circuit in the prior art. Further the elimination of the secondary fuel flow servo valve saves weight, increases reliability and simplifies the overall control. Fuel shutoff/purge valve 40 is controlled by the controller 34 to selectively connect fuel to the fuel flow path 32 or high pressure air from the air source through purge line 42 to the fuel flow path to permit blowing out of the primary and secondary fuel circuits 34 and 36. Air control valve 44 has a throttle member (not illustrated) which varies the airflow outputted from pressure regulator 46 which produces a constant output air pressure in dependence upon the power level commanded by the controller 34. The rate of fuel flow commanded by the fuel servo and ΔP valve 30 is the control parameter for controlling a constant overall air/fuel ratio under the control of the controller 34. The controller 34 may receive an external command (not illustrated) for controlling the output power or may control the output power in accordance with a control program contained within the controller 34. The air control valve 44 contains a position sensor for providing a signal to the controller 34 which specifies the position of the air control valve to provide closed loop control. Temperature sensor 48 provides the controller 34 with the temperature of the air within the airflow path 50 between the air control valve 44 and the combustor 12. The mass flow of air to the combustor is calculated by the equation:

$$\text{Mass Flow} = \sqrt{\frac{C_1 C_2 P_{REG}}{\text{Air Temperature}}}$$

wherein $C_1$ is a coefficient dependent upon the oxidant being used; $C_3$ is an orifice coefficient which is a function of the feedback from the position signal from the air control valve 44; $P_{REG}$ is the regulator pressure in pounds per square inch absolute which is outputted by the pressure regulator 46 and $T_{REG}$ is the air temperature in degrees Rankin sensed by the sensor 48. The controller outputs an airflow control signal to the air control valve 44 which is the independent variable controlling the power output of the power unit. The sensed temperature and air control valve position is utilized by the controller 34 to calculate the mass airflow flowing to the combustor 12 in accordance with the aforementioned equation. The controller 34 outputs a fuel flow control signal to the fuel servo and ΔP valve 30 which is dependent upon the commanded air flow to command a position of the throttling mechanism within the fuel control valve to produce a constant air/fuel ratio in the combustor with the primary air/fuel ratio being a 13.25:1 stoichiometric ratio and the secondary fuel ratio being a 2:30:1 ratio to cool the pressurized gas 22 from the combustor to a temperature at which the turbine rotor will not be damaged.

The single fuel servo and ΔP valve 30 has a smaller turndown ratio than the primary fuel servo system of the prior art. Assuming a dynamic range of 5:100 pounds per hour primary fuel rate and a 50:400 pounds per hour secondary fuel rate, the present invention will achieve control with a minimum flow rate of 55 pounds per hour and a maximum flow rate of 500 pounds per hour. The prior art turndown ratio of 20:1 in the primary fuel path requires a more expensive valve and is more difficult to control than the approximate 10:1 turndown ratio achieved by the single fuel servo and ΔP valve 30.

Figure 2:
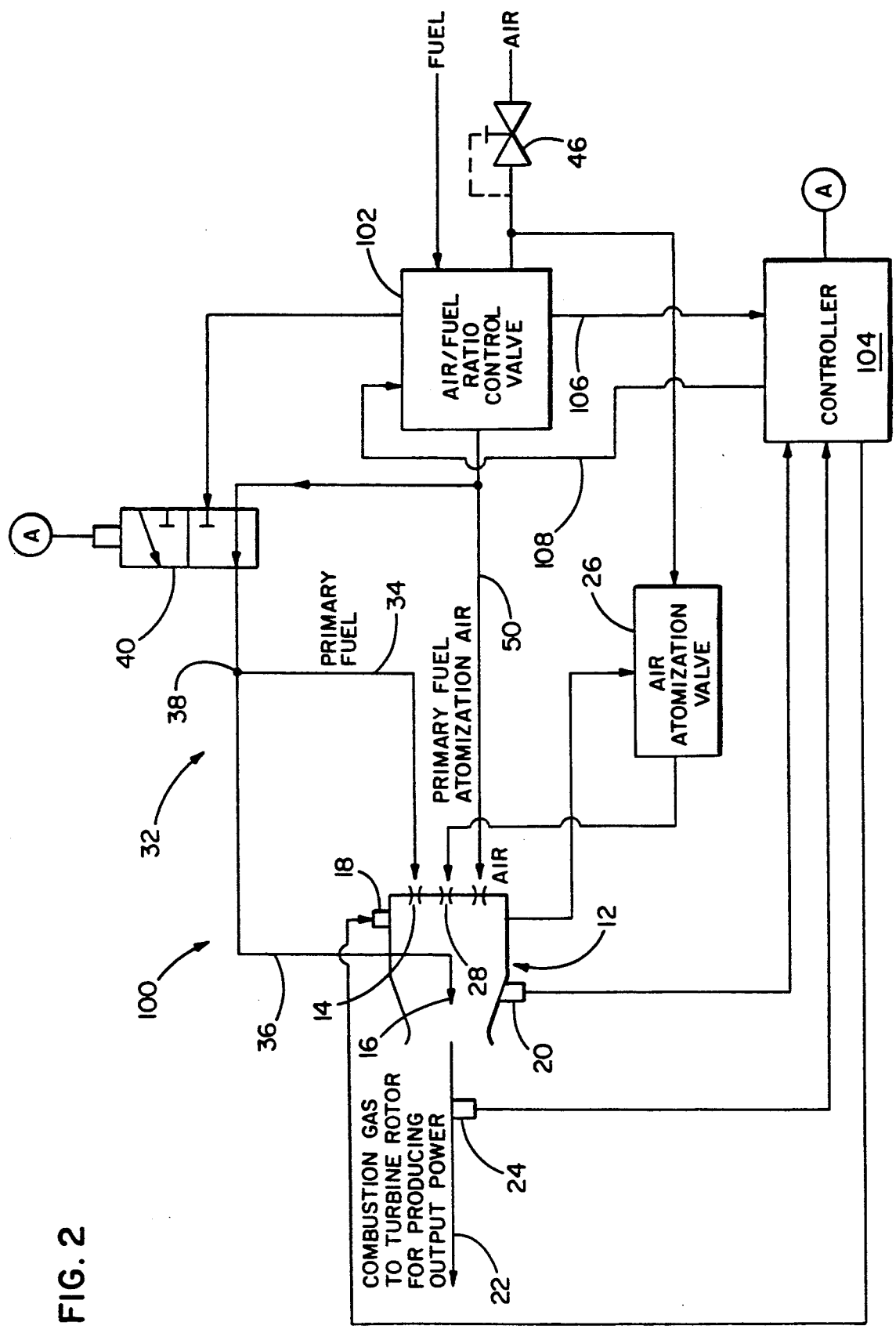
FIG. 2 illustrates a second embodiment of the present invention.

FIG. 2 illustrates a second embodiment 100 of the present invention. Like reference numerals identify like parts in FIGS. 1 and 2. The embodiment 100 of FIG. 2 differs principally from the embodiment 1 of FIG. 1 in that a single valve 102 which is controlled by a single independent variable from the controller 104 jointly controls the air and fuel flow while maintaining a constant air/fuel ratio for the primary and secondary injectors 14 and 16. The single valve 102 comprises a valve which meters a rate of airflow and fuel flow through a pair of orifices by moving a metering device a distance which is a function of a power level commanded by the controller. A suitable structure for implementing the valve 102 is described below with reference to FIG. 3. Additionally, temperature compensation may be achieved by changing the distance which the metering device moves only in metering airflow as a function of temperature for regulating only the airflow rate. The embodiment 100 eliminates the calculation of the mass flow rate as a consequence of the air/fuel valve 102 metering the flow of fuel and air to the combustor for variable power levels mechanically to maintain the constant air/fuel ratio. Feedback on the line 106 to the controller 104 is optional for the purpose of monitoring the flow rate actually occurring. The single control signal which regulates both the air and fuel flow through the valve 102 is coupled to the valve from the controller by line 108.

Figure 3:
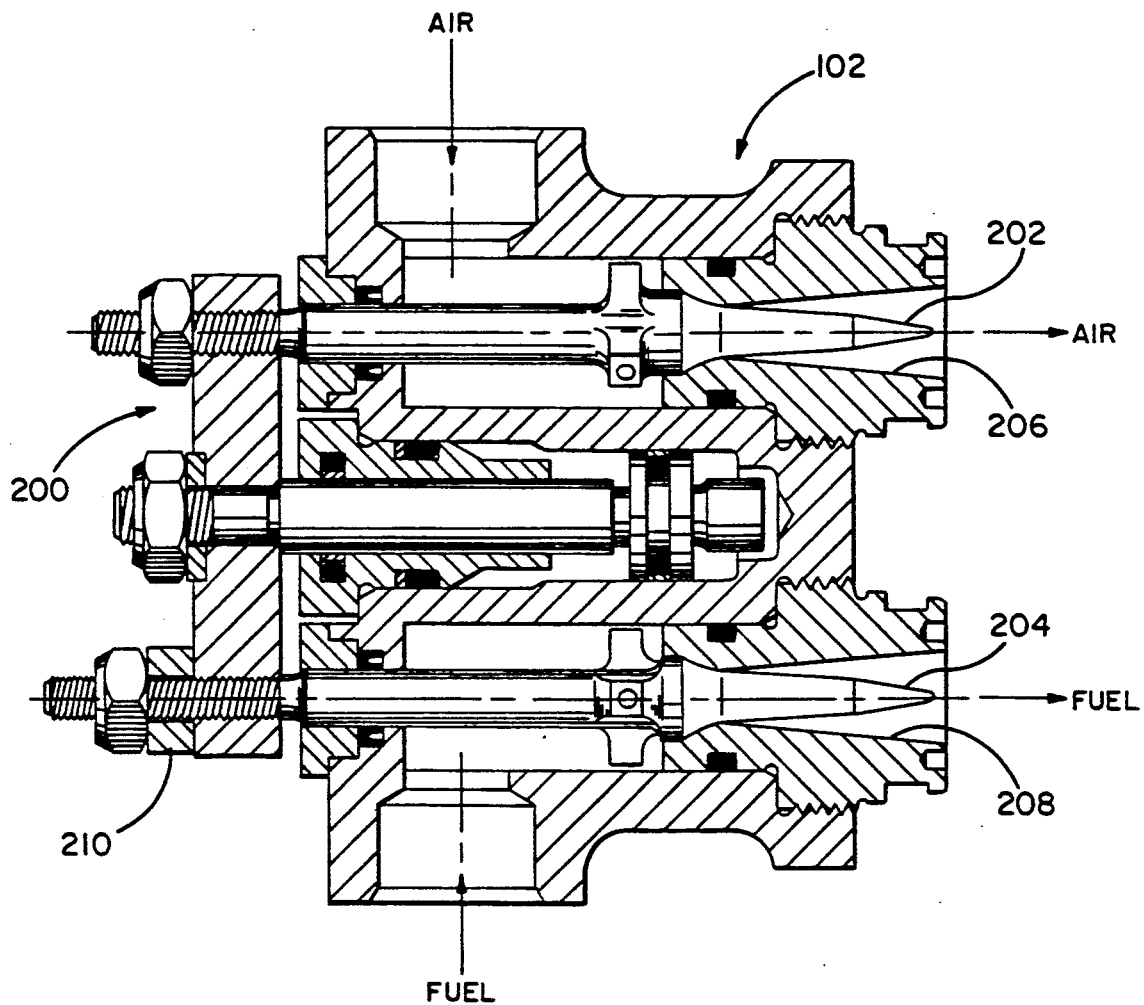
FIG. 3 illustrates an integrated fuel and air which may be used in the embodiment of FIG. 2.

FIG. 3 illustrates a schematic of a suitable valve for implementing the function of valve 102 in FIG. 2. The valve 102 is a modification of a commercially available bipropellant valve manufactured by Moog for regulating the flow of propellants to a combustor. Alternatively, the valve may be a modification of a valve manufactured by South Bend Controls, Inc. of South Bend, Ind. As a consequence of the blow down of pressurized air from an air pressure storage (not illustrated) through the pressure regulator 46 in FIGS. 1 and 2, the temperature in airflow path 50 may vary. Temperature compensation is desirable in the airflow metering path for the valve to compensate for variation in temperature in the airflow. As illustrated, a servo control (not illustrated) is attached to metering device 200 which has metering surfaces 202 and 204 disposed in the orifices 206 and 208 respectively coupled to the fuel and airflow sources for controlling the air and fuel flows. As the signal on line 108 varies from controller 104, the position of the metering surfaces 202 and 204 is varied as a function of the signal applied to the servo control. As a result of the metering surfaces 202 and 204 moving relative to the orifices 206 and 20 through which fuel and air flows, the flow through those orifices is varied as a function of the signal applied to the valve 102 from the controller 104.

It should be understood that the valve 102 may be implemented with different types of metering devices than illustrated while practicing the invention with the only requirement being that the metering device maintains a constant air/fuel ratio in the combustor 12. A temperature compensation device 210 is preferably included in the valve 102 which varies the flow rate through the air control orifice as a function of the temperature in the airflow path 50. The temperature compensation device 210 may be in the form of a stack of one or more bimetallic washers, such as a washer 210, which expand and contract as a function of temperature of the air flowing through the valve 102 which permits the metering surface 204 to be moved with respect to the air control orifice 208 without significantly moving with respect to the fuel control orifice 206 to provide correction for variation in temperature caused by blow down from the air pressure regulator 46.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A fuel and air control system for a power unit which produces output power from a turbine which rotates in response to pressurized gas provided by a combustor which combusts fuel which is injected into the combustor by a primary fuel injector to produce pressurized combustion gases cooled by fuel injected into the combustor by a secondary fuel injector comprising:
    a single fuel control valve coupled to a source of fuel which controls a combined fuel flow through a fuel flow path from the fuel control valve to the injectors in response to a fuel flow control signal;
    an air control valve coupled to an air source which controls a mass flow of air through an airflow path to the combustor in response to an airflow control signal; and
    a controller, providing at least one control signal, for causing the valves to produce flows resulting in a constant air/fuel ratio in the combustor during combustion when the fuel flow is varied under control of the controller.

2. A fuel and air control system in accordance with claim 1 wherein:
    the controller provides the at least one control signal for controlling the air control valve to provide mass flow of air through the airflow path to the combustor independent of pressure in the combustor.

3. A fuel and air control system in accordance with claim 1 further comprising:
    an air valve position sensor providing a position signal to the controller specifying a position of the air control valve;
    a temperature sensor coupled to the airflow path for providing a temperature signal to the controller specifying air temperature within the airflow path; and wherein
    the controller, in response to the position and temperature signals, calculates a mass flow of air in the airflow path and generates a fuel flow control signal for controlling the fuel control valve and an airflow control signal for controlling the air control valve as a function of the calculated mass flow and an output power level commanded by the controller.

4. A fuel and air control system in accordance with claim 2 further comprising:
    an air valve position sensor providing a position signal to the controller specifying a position of the air control valve;
    a temperature sensor coupled to the airflow path for providing a temperature signal to the controller specifying air temperature within the airflow path; and wherein
    the controller, in response to the position and temperature signals, calculates a mass flow of air in the airflow path and generates a fuel flow control signal for controlling the fuel control valve and an airflow control signal for controlling the air control valve as a function of the calculated mass flow and an output power level commanded by the controller.

5. A fuel and air control system in accordance with claim 1 further comprising:
    an air pressure regulator coupled to a source of pressurized air for providing air at a constant pressure to the air control valve.

6. A fuel and air control system in accordance with claim 2 further comprising:
    an air pressure regulator coupled to a source of pressurized air for providing air at a constant pressure to the air control valve.

7. A fuel and air control system in accordance with claim 3 further comprising:
    an air pressure regulator coupled to a source of pressurized air for providing air at a constant pressure to the air control valve.

8. A fuel and air control system in accordance with claim 4 further comprising:
    an air pressure regulator coupled to a source of pressurized air for providing air at a constant pressure to the air control valve.

9. A fuel and air control system in accordance with claim 3 wherein:
    the output power level is commanded by the controller by commanding variation of air flow and the fuel mass flow rate is commanded to vary in dependence upon a calculated air flow calculated from a measured air pressure and air temperature while maintaining a primary and overall air/fuel ratio.

10. A fuel and air control system in accordance with claim 9 further comprising:
    an air pressure regulator coupled to a source of pressurized air for providing air at a constant pressure to the air control valve.

11. A fuel and air control system in accordance with claim 1 wherein:
    the fuel control valve and air control valve are formed into a single valve which varies fuel flow and airflow in response to a single control signal from the controller while maintaining a constant air/fuel ratio.

12. A fuel and air control system in accordance with claim 11 wherein;
    the single vale meters a rate of airflow and fuel flow by moving a metering device a distance which is a function of a power level commanded by the controller.

13. A fuel and air control system in accordance with claim 12 wherein:

the single valve includes means for providing temperature compensation to change the distance which the metering device moves in an airflow path as a function of temperature of the air flowing through the valve.

14. A fuel and air control system in accordance with claim 2 wherein:
the fuel control valve and air control valve are formed into a single valve which varies fuel flow and airflow in response to a single control signal from the controller while maintaining a constant air/fuel ratio.

15. A fuel and air control system in accordance with claim 14 wherein;
the single valve meters a rate of airflow and fuel flow by moving a metering device a distance which is a function of a power level commanded by the controller.

16. A fuel and air control system in accordance with claim 15 wherein:
the single valve includes means for providing temperature compensation to change the distance which the metering device moves in an airflow path as a function of temperature of the air flowing through the valve.

17. A fuel and air control system in accordance with claim 5 wherein:
the fuel control valve and air control valve are formed into a single valve which varies fuel flow and airflow in response to a single control signal from the controller while maintaining a constant air/fuel ratio.

18. A fuel and air control system in accordance with claim 17 wherein:
the single valve meters a rate of airflow and fuel flow by moving a metering device a distance which is a function of a power level commanded by the controller.

19. A fuel and air control system in accordance with claim 18 wherein:
the single valve includes means for providing temperature compensation to change the distance which the metering device moves in an airflow path as a function of temperature of the air flowing through the valve.

20. A fuel and air control system in accordance with claim 1 wherein:
the power unit is an emergency power unit within an airframe.

21. A fuel and air control system in accordance with claim 1 wherein:
the power unit is an integrated power unit within an airframe.

22. A fuel and air control system in accordance with claim 1 wherein:
the controller provides the at least one control signal for causing the primary fuel injector and the air control valve to produce stoichiometric combustion and the secondary fuel injector to inject fuel to cool the pressurized combustion gases.

23. A fuel to air control system in accordance with claim 22 wherein:
the stoichiometric combustion of fuel from the primary fuel injector has an air to fuel ratio of 13.25 and the gas to fuel ratio of the secondary fuel injector to cool the pressurized combustion gases is 2.30.

* * * * *